US008625027B2

(12) United States Patent
Musser, Jr. et al.

(10) Patent No.: US 8,625,027 B2
(45) Date of Patent: Jan. 7, 2014

(54) SYSTEM AND METHOD FOR VERIFICATION OF MEDIA CONTENT SYNCHRONIZATION

(75) Inventors: Elmer Gehman Musser, Jr., St. James, NY (US); Hardys Christ Eggum, Muttontown, NY (US); John Joseph Galligan, Wading River, NY (US)

(73) Assignee: Home Box Office, Inc., New York, NY (US)

( * ) Notice: Subject to any disclaimer, the term of this patent is extended or adjusted under 35 U.S.C. 154(b) by 70 days.

(21) Appl. No.: 13/337,935

(22) Filed: Dec. 27, 2011

(65) Prior Publication Data

US 2013/0162902 A1 Jun. 27, 2013

(51) Int. Cl.
*H04N 9/475* (2006.01)
*H04N 5/222* (2006.01)

(52) U.S. Cl.
USPC ............................................ 348/515; 348/722

(58) Field of Classification Search
USPC ........... 348/515, 722, 700, 70, 180, 181, 192; 725/22, 143–146; 709/225, 228, 229; 702/66, 71–73
See application file for complete search history.

(56) References Cited

U.S. PATENT DOCUMENTS

| 4,682,246 | A  | * | 7/1987  | Efron et al. ............... 386/263 |
|-----------|----|---|---------|--------------------------------------|
| 6,628,737 | B1 | * | 9/2003  | Timus ...................... 375/368 |
| 7,328,153 | B2 | * | 2/2008  | Wells et al. ................ 704/231 |
| 7,555,196 | B1 |   | 6/2009  | Crawford et al.                      |
| 7,809,154 | B2 |   | 10/2010 | Lienhart et al.                      |
| 7,991,198 | B2 | * | 8/2011  | Zhao et al. ................ 382/112 |
| 2003/0156733 | A1 | * | 8/2003  | Zeller et al. ............... 382/100 |
| 2005/0102397 | A1 | * | 5/2005  | Tsuyama et al. .......... 709/225 |
| 2006/0015464 | A1 | * | 1/2006  | Dewolde .................... 705/57 |
| 2006/0277609 | A1 | * | 12/2006 | Brandon ..................... 726/28 |
| 2006/0286489 | A1 | * | 12/2006 | Duffield et al. ........... 430/380 |
| 2008/0062315 | A1 |   | 3/2008  | Oostveen et al.                      |
| 2011/0129116 | A1 | * | 6/2011  | Thorwirth ................. 382/100 |
| 2011/0222787 | A1 | * | 9/2011  | Thiemert et al. ......... 382/225 |
| 2011/0261257 | A1 | * | 10/2011 | Terry et al. ............... 348/515 |

* cited by examiner

*Primary Examiner* — Victor Kostak
(74) *Attorney, Agent, or Firm* — Kenyon & Kenyon LLP

(57) ABSTRACT

In a system and method for verification of media content synchronization, the system may include a processor configured to perform a method including determining at least one similarity score of a copy of a master program based on a comparison of at least one signature of the copy with at least one signature of the master program.

19 Claims, 6 Drawing Sheets

SYSTEM AND METHOD FOR VERIFICATION OF MEDIA CONTENT SYNCHRONIZATION

FIELD OF THE INVENTION

The present invention relates to a system and method for verification of media content synchronization, in particular, verifying the synchronization between video and audio streams included in media content.

BACKGROUND INFORMATION

Media content may include multiple types of data streams, for example, video, audio, closed captioning, and/or other types of streams. For any single program of media content, it may be necessary to verify that each of the data streams included in the program are in synchronization with each other. For example, for programs such as movies, television shows and the like, it may be necessary to make sure that the video stream is synchronized with the audio stream. This type of synchronization may be referred to as lip synchronization, i.e., matching the motions of a speaker's lips recorded in the video stream with the audible sounds spoken by the speaker recorded in the audio stream. More generally, lip synchronization refers to the matching of the video stream with the audio stream, and is not limited to matching a speaker's lips with the spoken words. Lip synchronization is generally verified through a manual process in which a person testing synchronization views and listens to the program in real-time and determines if the video and audio streams are synchronized. By such a manual verification process, a master copy having a known good synchronization between the various data streams may be identified and/or stored.

Programs including video, audio and/or other types of data streams may be copied, converted to different file types and packaged differently for distribution when copies of a single program are to be delivered to multiple different consumers and/or types of output devices, such as for example, televisions, computers, cellular phones, and/or other devices. Examples of file type conversion may include MPEG compression of a video stream and/or Dolby AC3 compression of an audio stream. An example of packaging may include an MPEG transport stream in which video and audio files are wrapped for transmission and delivery. However, during the copying, conversion and/or packaging of copies of a program, the synchronization between the various data streams may be altered. For example, the audio stream may be delayed or advanced with respect to the video stream, such that audible sounds do not correctly match the corresponding visible motions/actions. If delivered, such copies having synchronization errors may create a poor viewing experience for consumers, and therefore, it may be necessary to include an additional process prior to delivery to prevent such errors from reaching consumers. Thus, a manual process for verification of synchronization, similar to the manual verification process previously completed for the known good master copy, may be required for each subsequent copy before delivering any copies of programs to consumers. Accordingly, a person testing synchronization may be required to view and listen to each of the copies of a program in real-time in order to determine if the video and audio streams are synchronized.

The manual verification process is time-consuming because it requires an individual to view and listen to each copy of a program in real-time. If many copies are created for delivery to multiple output devices and consumers, each of these copies must be manually viewed and listened to in real-time, thereby adding time and cost to the overall process.

In addition, because the manual verification process relies on humans to determine whether synchronization between data streams is acceptable, the manual verification process necessarily lacks consistency. For example, one individual viewing a copy may find the synchronization to be acceptable, whereas another individual viewing the same copy may find the synchronization to be unacceptable. Moreover, even a single human may lack consistency over time. For example, an individual viewing a copy may find the synchronization to be acceptable after one viewing, but, if that same individual were to view the same copy again, that individual may determine that the synchronization is unacceptable during the second viewing. Furthermore, multiple other factors may affect the performance of each person testing synchronization at any point in time, such as for example, fatigue, mood, stress, general attentiveness, outside distractions and/or other factors. Thus, the manual verification process lacks consistency due to a number of factors. Moreover, the manual verification process also lacks an objective measure by which to consistently determine whether the synchronization between data streams, such as between video and audio streams, is acceptable.

As an alternative to the manual process for verification of synchronization, measurable markers, e.g., a test signal, may be embedded in the various data streams of a program in order to determine the synchronization. For example, one or more measurable markers may be embedded at particular time points in a video stream, and corresponding measurable marker(s) may be embedded at the same particular time points in an audio stream. Thereafter, when a copy of the program including the measurable markers is created, converted and/or packaged, it can be determined whether the measurable markers embedded in the various data streams of the copy remain aligned with each other, thereby verifying that the synchronization has been maintained. However, this process requires altering the various data streams of an original program by embedding measurable markers, including the additional process steps of embedding those markers into each of the various data streams of the program and recovering those markers during playback. In addition, this process requires real-time playback of the media content in order to accurately capture the measurable markers embedded in the various data streams.

SUMMARY

Example embodiments of the present invention provide for verification of media content synchronization using a process that can be completed faster than the real-time viewing of the media content. The process may also provide a consistent and objective method by which to accurately and quickly verify the synchronization of media content. Further, the process may allow for verification of synchronization without altering the program itself.

According to an example embodiment of the present invention, a master program may include two components, whose synchronization has been confirmed. The two components may be, for example, a video component and an audio component. The audio and video components may have a length measurable in units of time, where each portion of the respective component would be played back in such units of time. The audio and video components of a synchronized master program have running times. Each of the audio and video components can be divided into a plurality of segments over its running time, in which each segment of the audio component matches a corresponding segment of the video component over a same segment of their running times, such that each of the corresponding segments of audio and video components form a pair of corresponding segments. In an example embodiment, for each of at least one, e.g., a plurality of, pair(s) of corresponding segments of the two components, a processor generates a fingerprint of each segment of the pair. For each such pair of fingerprints, the processor generates a signature formed by a combination of the fingerprints. Then, the complete sequence of the generated signatures over the running time of the synchronized master program may be stored as a representation of the synchronization of the two components, e.g., a synchronization of the video and audio components, because a shift in time of the audio component relative to the video component would produce different signatures, as there would be a different combination of audio and video per sampled segment. The fingerprints may be produced such that slightly different fingerprints would be generated for different sampled segments that are slightly offset in time from each other (e.g., where the shift occurs at a point corresponding to a subtle change in content, for example, where the shift is due to the removal of several video frames).

For a copy of the master program, e.g., whose production includes a processing rendering the program suitable for a particular output device, the system may similarly generate fingerprints and a sequence of one or more signatures over the running time of the copy.

The system may compare the sequence of one or more signatures of the copy to the sequence of one or more signatures of the synchronized master program. Such comparison may be performed prior to playback of the copy and may be performed in a short processing time, substantially faster than the time required for playback of the content. Based on the comparison, the system may generate a similarity score. Since the fingerprinting is content based, such that slight variations in the content produce slightly different fingerprints, therefore the resulting signatures may also be such that slight offsets in time between the two program components, e.g., the audio and video, produce slightly different signatures. Accordingly, the system may generate a score whose value depends on the difference between the compared signatures, where the greater the difference, the lower the score.

In an example embodiment, the system may compare a plurality of the signatures of the copy to a corresponding plurality of signatures of the master program, and the score may be dependent on the number of compared signatures that do not match, regardless of a degree of difference between any of the mismatching signatures.

In an alternative example embodiment, the score may be based on a combination of the comparisons of the plurality of signatures, where the degree of difference between each compared pair of signatures is considered. For example, the system may compute an average score based on a plurality of individual scores of the individual compared pairs of signatures, where the individual scores depend on the degree of difference between the two signatures of the respective signature pairs.

In an alternative example embodiment, a single pair of signatures may be compared to determine whether there is an exact match, and the copy may be discarded where there is not an exact match.

According to an example embodiment of the present invention, a computer-implemented method of verification of media content synchronization may provide for determining, by a computer processor, at least one similarity score of a copy of a master program based on a comparison of at least one signature of the copy with at least one signature of the master program.

In one example variant of this embodiment, the method may further provide for, based on the determination, determining, by the processor, whether to provide the copy for distribution.

In one example variant of this embodiment, the at least one similarity score represents a variance between the at least one signature of the copy and the at least one signature of the master program.

In one example variant of this embodiment, the at least one similarity score is determined faster than real-time in a file-based domain.

In one example variant of this embodiment, the at least one similarity score is determined without altering a video stream and an audio stream of the master program and the copy.

In one example embodiment of the method, the method may further provide for comparing, by the processor, the at least one similarity score to a threshold level.

In one example variant of this embodiment, the copy is determined to be acceptable for distribution if the at least one similarity score at least one of meets and exceeds the threshold level.

In one example embodiment of the method, the method may further provide for adjusting the threshold level.

In one example embodiment of the method, the method may further provide for generating, by the processor, a video fingerprint of a segment of a video stream of the master program, and an audio fingerprint of a corresponding segment of an audio stream of the master program, generating, by the processor, a video fingerprint of the corresponding segment of a video stream of the copy, and an audio fingerprint of the corresponding segment of an audio stream of the copy, generating, by the processor, the at least one signature of the master program based on the video fingerprint and the audio fingerprint of the master program, and generating, by the processor, the at least one signature of the copy based on the video fingerprint and the audio fingerprint of the copy.

In one example embodiment of the method, the method may further provide for storing, by the processor, the at least one signature of the master program and the at least one signature of the copy in a database.

In one example embodiment of the method, the method may further provide for prior to the generating of the video fingerprint and the audio fingerprint of the master program, converting, by the processor, the master program to an uncompressed format, and prior to the generating of the video fingerprint and the audio fingerprint of the copy, converting, by the processor, the copy to an uncompressed format.

According to an example embodiment of the present invention, a hardware computer-readable medium having stored thereon instructions executable by a processor may be provided, the instructions which, when executed by the processor, cause the processor to perform a method of verification of media content synchronization, the method including determining at least one similarity score of a copy of a master program based on a comparison of at least one signature of the copy with at least one signature of the master program.

According to an example embodiment of the present invention, a transmission method may include transmitting instructions executable by a processor, the instructions which, when executed by the processor, cause the processor to perform a method of verification of media content synchronization, the method including determining at least one similarity score of a copy of a master program based on a comparison of at least one signature of the copy with at least one signature of the master program.

According to an example embodiment of the present invention, a system for verification of media content synchronization may include a computer processor configured to determine at least one similarity score of a copy of a master program based on a comparison of at least one signature of the copy with at least one signature of the master program.

According to an example embodiment of the present invention, a computer-implemented method for verification of media content synchronization may include for each of two versions of media content: (a) for each of at least one segment of a first media component of the respective media content, generating, by a computer processor, a fingerprint representative of the respective segment of the first media component; and (b) for each of at least one segment of a second media component of the respective media content, generating, by the processor, a fingerprint representative of the respective segment of the second media component; comparing, by the processor, the fingerprints generated for one of the two versions to the fingerprints generated for another of the two versions; generating, by the processor, a score representing a degree of difference between the compared fingerprints; comparing, by the processor, the score to a threshold; and providing, by the processor, one of the two versions conditional upon that the score meets the threshold.

In one example embodiment of the method, the method may further provide for the each of the two versions of the media content: for each of at least one segment pair formed by a respective one of the each of the at least one segment of the first media component and a respective one of the each of the at least one segment of the second media component, generating a signature of the pair, where the comparison is performed by comparing the signatures generated for the two versions.

In one example variant of this embodiment, the comparison is performed prior to playback and in a processing time that is less than a time required for playback of the media content versions.

According to an example embodiment of the present invention, it may not be necessary to initially provide a master program having verified synchronization of data streams. Instead, a plurality of copies of a program having various data streams may be provided. For example, for a program having a video component and an audio component for which synchronization is to be verified, each of the plurality of copies may be processed to determine at least one fingerprint of the video component and at least one fingerprint of the audio components. Then, each of the pairs of video and audio fingerprints corresponding to a same segment of each copy's running time may be processed to determine a signature for that segment of the copy's running time. Following the fingerprint and signature generation process, each of the plurality of copies will have at least one, e.g., a sequence of, signature(s) for corresponding segments in time of the overall running time. The signatures of each of the plurality of copies of the program may be stored for further processing.

Then, the signatures of each copy of the program may be compared to the signatures of each of the other copies of the program. Based on the degree of similarity between the signatures of the compared copies, a similarity score for the compared copies may be determined. In this manner, similarity scores for each copy with respect to each of the other copies are determined. The copies having similarity scores that meet or exceed a defined threshold for similarity with each other are determined to be equal with respect to the relationships of their audio and video streams. If one or more similarity scores for a copy does not meet or exceed the defined threshold for similarity, these copies are determined to be not equal to the other copies, with respect to the relationship of their audio and video streams, for which the similarity scores were calculated.

Following the determination of the similarity scores for the plurality of copies, all of the copies that are determined to be equal with respect to the relationships of their audio and video streams will have similarity scores that meet or exceed a defined threshold for similarity with the other copies. Each copy that is determined to be not equal to all other copies, with respect to their respective relationships of their respective audio and video streams, is quickly rejected as not having synchronized media content.

From the plurality of copies that are determined to be equal, with respect to their respective relationships of their respective audio and video streams, to each of the other copies, a single copy is chosen for verification of media content synchronization. For example, the single chosen copy can be manually verified for media content synchronization by having a person testing synchronization view and listen to the audio and video streams of the single chosen copy. If the person testing synchronization verifies that the single chosen copy has synchronized media content, then the plurality of copies that are determined to be equal with respect to the relationships of their audio and video streams are verified as having synchronized media content.

According to an example embodiment of the present invention, a computer-implemented method of verification of media content synchronization may provide for determining, by a computer processor, at least one similarity score of a first copy of a program based on a comparison of at least one signature of the first copy with at least one signature of a second copy of the program.

In one example variant of this embodiment, each copy of a plurality of copies having similarity scores that meet or exceed a threshold for similarity with every other copy of the plurality of copies are determined to be equal with respect to the relationship between their data streams.

In one example variant of this embodiment, the method may further provide for verifying synchronization of the plurality of copies by a manual verification process of one of the plurality of copies determined to be equal with respect to the relationship between their data streams.

For all of the example embodiments, the fingerprint generation process and the signature generation process can be completed faster than real-time playback of the program. In addition, for a plurality of copies of a program, the fingerprint generation and signature generation processes can be parallel-processed faster than real-time, thereby resulting in further time savings.

The various features and embodiments described herein may be provided in various combinations.

DETAILED DESCRIPTION OF EXAMPLE EMBODIMENTS

Figure 1:
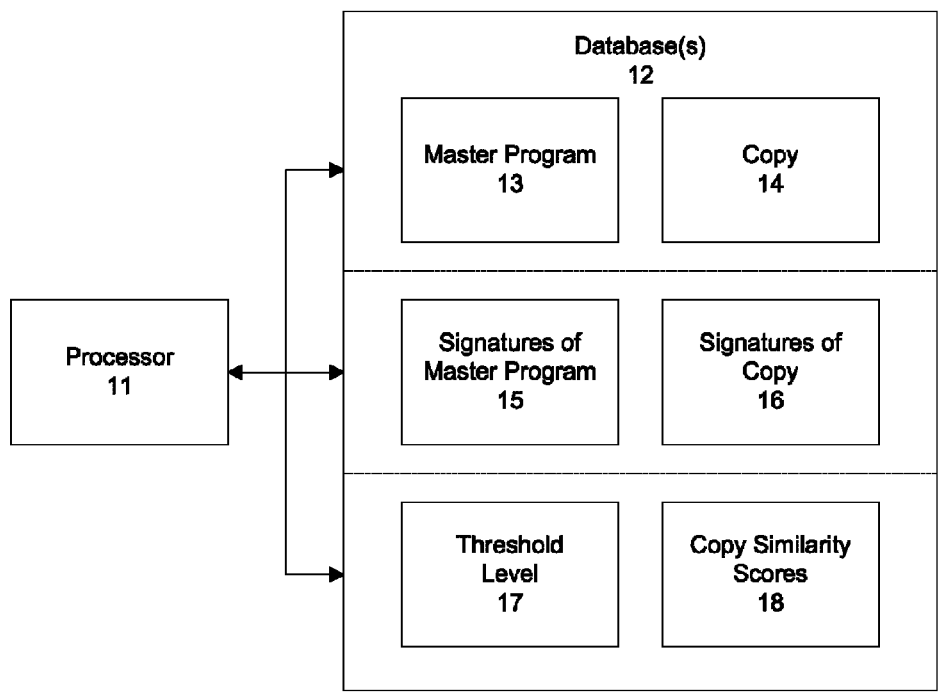
FIG. 1 is a schematic diagram illustrating an exemplary system for verification of media content synchronization according to an example embodiment of the present invention.

FIG. 1 is a schematic diagram illustrating an exemplary system 10 for verification of media content synchronization according to an example embodiment of the present invention.

The system 10 may include a processor 11, and one or more databases 12. The database 12 may store a master program 13, a copy 14 of the master program 13, signatures 15 of the master program 13, signatures 16 of the copy 14, a threshold level 17 for synchronization verification, and similarity scores 18 for the copy 14. As schematically illustrated by the dashed lines in FIG. 1, one or more databases 12 may store one or more of the above sets of data.

The master program 13 may be a program that includes multiple types of data streams such as, for example, a video stream and an audio stream. The master program 13 may be a known good copy of the program, i.e., the video stream and the audio stream are known to be synchronized. In this regard, the master program 13 may be received from a trusted source such that no additional verification of synchronization need be performed. Alternatively, the master program 13 may be manually checked by a person who views and listens to the master program 13 in real-time in order to ensure correct synchronization between the video and audio streams. Although the below discussion describes the synchronization of video and audio streams, the example system and method may also be applied to synchronizing other additional types of data streams.

The copy 14 of the master program may be a copy that is converted, packaged, and/or otherwise processed for distribution to particular output devices. For example, output devices may include televisions, computers, cellular phones, and/or other devices, of which one or more may require that the copy 14 be converted, packaged and/or processed in order to be output on the respective device. Additional processing may include data compression, file type conversion, and others. Although FIG. 1 illustrates only a single copy 14 for simplicity of discussion, it is understood that the database 12 may include many different copies 14 that have been processed for a plurality of different output devices.

The database 12 may also store signatures 15 of the master program 13 and signatures 16 of the copy 14. The signatures 15, 16 may be digital representations of segments of a program, in which the digital representations uniquely identify the corresponding segments. For example, the signatures 15, 16 may be digital representations of segments of the combined video and audio streams. Accordingly, the signatures 15, 16 may be stored in the database 12 as file-based data corresponding to the actual video and audio streams of a program. The generation of the signatures 15, 16 will be further discussed herein with reference to FIGS. 5 and 6.

The database 12 may also store a threshold level 17 for synchronization verification, which defines an acceptable level of synchronization of a copy 14 as compared to a master program 13. The threshold level 17 may be a level related to an acceptable variance between the video and audio streams of the copy 14, for example. In addition, the threshold level 17 may be adjusted depending on the relative shift between the video and audio streams of the copy 14.

For example, in an example embodiment of the present invention, in order to determine whether an audio stream is leading or lagging behind the video stream, an additional comparison of the signatures of the copy 14 to sample signatures having either a very premature audio stream or a very delayed audio stream may be performed. If it is determined that the signatures of the copy 14 are more similar to the sample signatures having a very premature audio stream as opposed to the sample signatures having a very delayed audio stream, then the audio stream is determined to lead the video stream, and the system can accordingly adjust the threshold level 17 to a higher value, such that very little to no degree of the audio stream leading the video stream is allowed. As a result, signatures of the copy 14 would need to meet or exceed the higher threshold value 17 in order to be determined equal in relationship to the signatures of the master program 13. Alternatively, if it is determined that the signatures of the copy 14 are more similar to the sample signatures having a very delayed audio stream as opposed to the sample signatures having a very premature audio stream, then the audio stream lags behind the video stream, and the system can accordingly adjust the threshold level 17 to a lower value, such that a larger degree of lagging of the audio stream as compared to the video stream is allowed. As a result, signatures of the copy 14 would need to meet or exceed the lower threshold value 17 in order to be determined equal in relationship to the signatures of the master program 13. The threshold level 17 for synchronization verification will be further discussed herein with reference to FIGS. 5 and 6.

The database 12 may also store similarity scores 18 for a copy 14. The scores 18 may be calculated based on a comparison between the signatures 15 of the master program 13 and the signatures 16 of the copy 14. For example, the scores 18 may be a measure related to a variance between the video and audio streams of the copy 14 as compared to the known synchronized video and audio streams of the master program 13. The scores 18 may then be compared with the threshold level 17 in order to determine whether the copy 14 is acceptable for delivery to an end user. The similarity scores 18 will be further discussed herein with reference to FIGS. 5 and 6.

Figure 2:
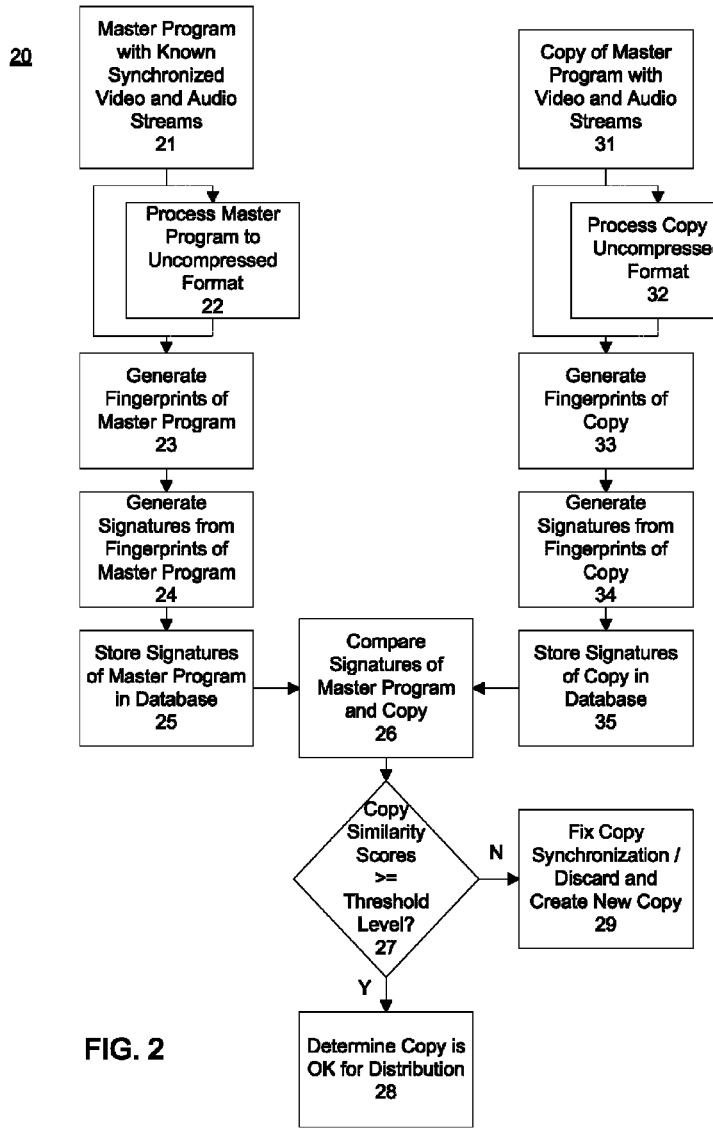
FIG. 2 is a flowchart illustrating an exemplary method of verification of media content synchronization according to an example embodiment of the present invention.
Figure 5:
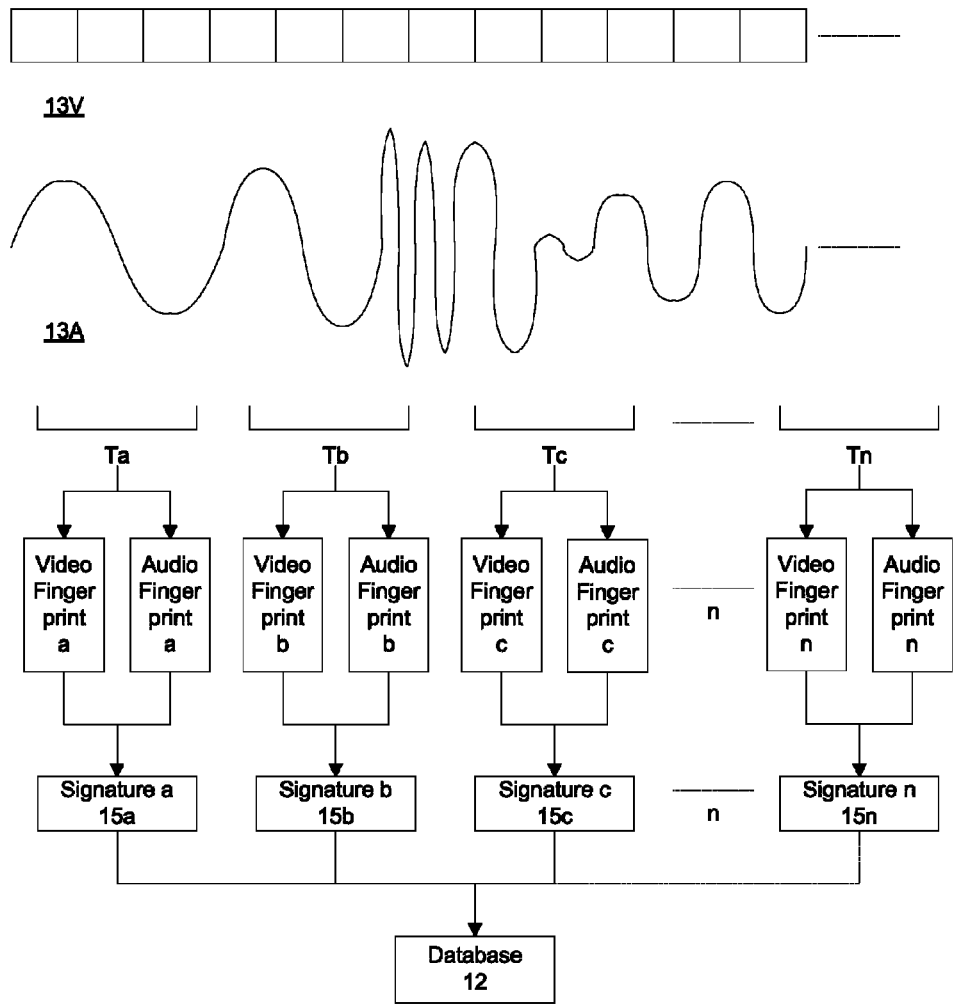
FIG. 5 illustrates generation of fingerprints and signatures of a source program for verification of media content synchronization according to an example embodiment of the present invention.
Figure 6:
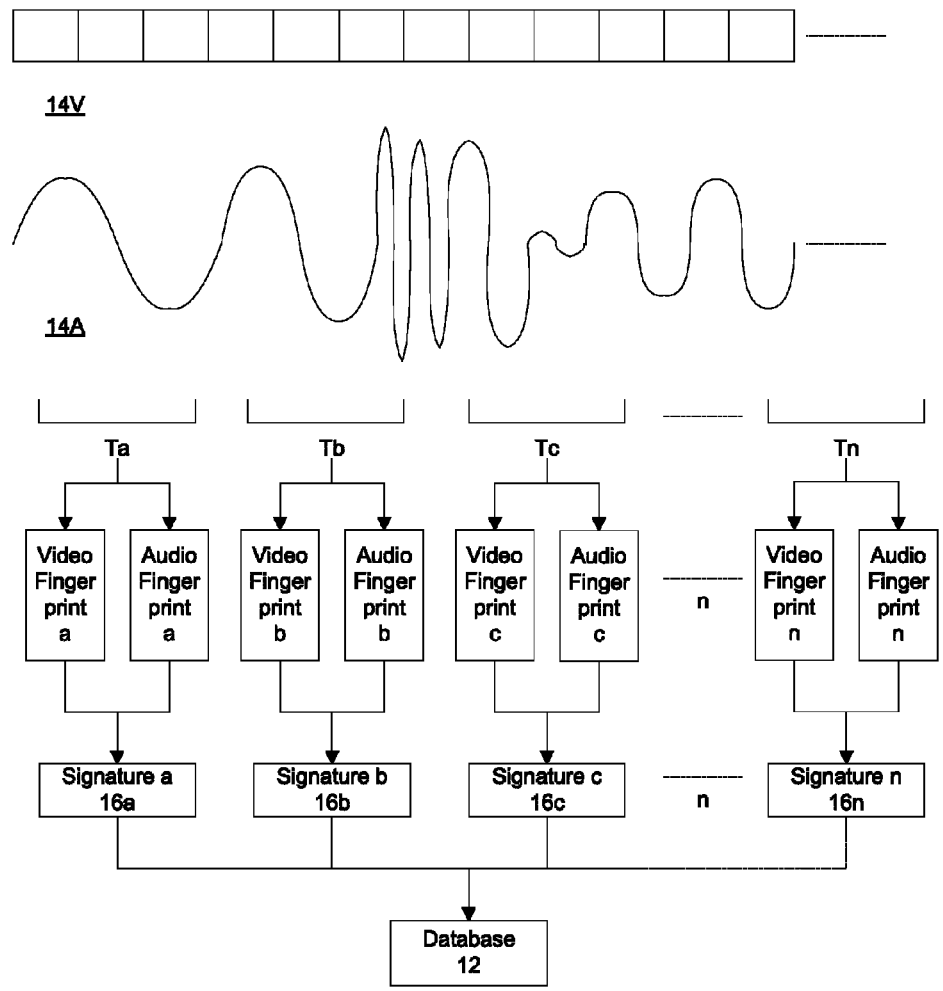
FIG. 6 illustrates generation of fingerprints and signatures of a program copy for verification of media content synchronization according to an example embodiment of the present invention.

FIG. 2 illustrates an exemplary method 20 of verification of media content synchronization according to an example embodiment of the present invention, and FIGS. 5 and 6 illustrate an example of generating fingerprints and signatures for verification of media content synchronization according to an example embodiment of the present invention.

Referring to FIG. 2, at step 21, a master program 13 having a known synchronization of video and audio streams may be provided. At step 22, if required, the master program 13 may be processed to an uncompressed format. Step 22 may not be required if the master program 13 is already in an uncompressed format. In an alternative example embodiment, the generation of the fingerprints and signatures may be performed in a format other than the uncompressed format.

At step 23, fingerprints of the master program 13 may be generated using known fingerprinting processes. The fingerprints of the master program 13 may include at least one video fingerprint of the video stream and at least one audio fingerprint of the audio stream. The fingerprints may be generated for corresponding segments in time of each of the video stream and audio stream. That is, each video fingerprint may have a corresponding audio fingerprint over a matching segment in time of the video/audio streams. At step 24, signatures 15 of the master program 13 may be generated based on the combined fingerprints of the video and audio streams that correspond to the same segments in time. At step 25, the signatures 15 of the master program 13, and optionally the fingerprints, may be stored in the database 12.

The fingerprints and signatures 15 may be generated faster than a time required for real-time playback. The length of the sample segments and the relative spacing between segments may be determined, for example, based on the length of the master program 13 and/or the number of signatures needed to reliably determine synchronization between the video and audio streams.

By completing steps 21 to 25, signatures 15 of a master program 13 having known good synchronization between the video and audio streams may be stored in the database 12. Then, the signatures 15 of the master program 13 may be compared to signatures of copies 14 of the master program 13 in order to determine whether such copies 14 have maintained the synchronization between the video and audio streams.

Accordingly, at step 31, a copy 14 of the master program 13 may be provided. As explained above, due to conversion, packaging, and/or other processing during the creation of a copy 14, the data streams of the copy 14 may be altered with respect to each other, i.e., the synchronization between data streams may be altered. In order to prevent the distribution to end users of copies having synchronization errors, it may be desirable to check the synchronization of the copy 14 by comparison to the known good synchronization of the master program 13. Thus, at step 32, if required, the copy 14 may be processed to an uncompressed format. Step 32 may not be required if the copy 14 is already in an uncompressed format, or if the method is completed with a copy 14 in a format other than an uncompressed format. It may be advantageous that the copy 14 be in the same format as the master program 13 in order to more accurately determine the relative synchronization of the copy 14 as compared to the master program 13.

At steps 33 and 34, fingerprints and signatures 16 of the copy 14 may be generated using known fingerprinting processes, using a process similar to that described above with respect to the generation of fingerprints and signatures 15 of the master program 13. Further, the fingerprints and signatures 16 of the copy 14 may be generated using segments in time corresponding to those that were used in the generation of the fingerprints and signatures 15 of the master program 13. The generation of the fingerprints and signatures 16 of the copy 14 will be discussed in more detail herein with reference to FIG. 6. At step 35, the signatures 16 of the copy 14, and optionally the fingerprints, may be stored in the database 12.

The fingerprints and signatures 16 of the copy 14 may be generated faster than real-time. That is, the entirety of the copy 14 need not be output in real-time to create the signatures 16. It may be advantageous to use sample segments in time for the generation of signatures 16 of the copy 14 that are the same as those used for the generation of signatures 15 of the master program 13, such that a direct comparison between the signatures 15, 16 may be possible. By completing steps 31 to 35, signatures 16 of a copy 14 having an unknown synchronization between the video and audio streams may be stored in the database 12. In addition, for a plurality of copies 14 of a program, the fingerprint generation and signature generation processes can be parallel-processed faster than real-time, thereby resulting in further time savings.

At step 26, the signatures 15 of the master program 13 and the signatures 16 of the copy 14 stored in the database 12 may be compared to determine the level of synchronization of the video and audio streams of the copy 14. Because the signatures 15, 16 of each of the master program 13 and the copy 14 may be generated over corresponding segments in time of the video and audio streams, it may be possible to directly compare signatures 15, 16 and quickly determine the degree of similarity/dissimilarity. For example, as shown in FIGS. 5 and 6, signature 15*a* of the master program 13 may be compared directly with signature 16*a* of the copy 14 because each of these signatures 15*a*, 16*a* was generated over the same sample period of time Ta. For the same reasons, signature 15*b* and signature 16*b* over sample period of time Tb may be directly compared, signature 15*c* and signature 16*c* over sample period of time Tc may be directly compared, etc. Further, the comparison of the signatures 15, 16 may be completed as a file-based comparison without requiring a real-time playback of the video/audio streams of either the master program 13 or the copy 14. Thus, it may be possible to quickly and simply compare the signatures 15, 16 faster than real-time, without requiring playback of the copy.

In an example embodiment of the present invention, the comparison of each pair of signatures 15*a* and 16*a* (15*b* and 16*b*, etc.) results in a similarity score for each such pair of signatures. The similarity scores may be a measure related to a variance between each signature 16 of the copy 14 as compared to each known, corresponding synchronized signature 15 of the master program 13. For example, the similarity scores may be expressed as a percentage of matching between each pair of signatures 15, 16, 100% denoting an exact match between the signatures and 0% denoting a complete mismatch between the signatures. Alternatively, the similarity scores may be based on any other scoring method that provides a range between an exact match and a complete mismatch.

At step 27, each similarity score 18 of each pair of signatures 15, 16 may be compared against a threshold level 17. The threshold level 17 for synchronization verification may define an acceptable level of synchronization of a copy 14 to a master program 13. For example, the threshold level 17 may be a level related to an acceptable variance between the signatures 16 of the copy 14 and the signatures 15 of the master program 13. In the case in which the similarity scores 18 are expressed as percentages, for example, the threshold level 17 may also be expressed as a percentage, at and/or above which the level of synchronization may be considered acceptable for end users.

If all similarity scores 18 for signatures 16 of a copy 14 meet and/or exceed the threshold level 17 for synchronization verification with signatures 15 of a master program 13, then at step 28, the copy may be determined to be acceptable for distribution to end users. On the other hand, if one or more of the similarity scores 18 of a copy 14 do not meet the threshold level 17 for synchronization verification, then at step 29, the copy 14 may undergo processing to fix the synchronization errors, or the copy 14 may be discarded and a new copy created and verified for media content synchronization. Alternatively, a combined score may be generated based on the individual scores of the individual signature comparisons, which combined score may be compared to a threshold. Alternatively, a single pair of signatures may be compared to produce a single score compared to a threshold.

According to the example embodiments of the present invention, verification of media content synchronization may be completed faster than real-time. For example, the generation of fingerprints and/or signatures of the master program and copies may be completed faster than real-time by sampling segments of the master program and copies. Further, the comparison of the signatures of a master program and the signatures of the copies is performed based on the signatures stored as files in a database, for example. Thus, the comparison may also be performed faster than real-time, since it is again not necessary to linearly output in real-time either an entire master program or any of its copies in order to perform the comparison.

Moreover, by the use of similarity scores based on a comparison between signatures and by the use of a threshold level for such similarity scores, a consistent and objective level of verification of media content synchronization may be provided that is not dependent on outside factors such as human errors, fatigue, stress and others. Therefore, a consistent end user experience may be ensured by eliminating the high number of variables associated with manual verification of synchronization performed by humans, as described above. The threshold level with which the system is programmed, and which is applied to all copies of a master program may be set to provide an improved end user experience, and/or reduce the number of false negatives, i.e., programs that, although rejected as having synchronization errors, are actually acceptable because the errors are not ascertainable by end users. Further, since no test signals or data are added to the video and/or audio streams of the master program or copies, there is no additional risk of detrimentally affecting the end user experience by the transmission of such added test signals or data to end users.

Figure 3:
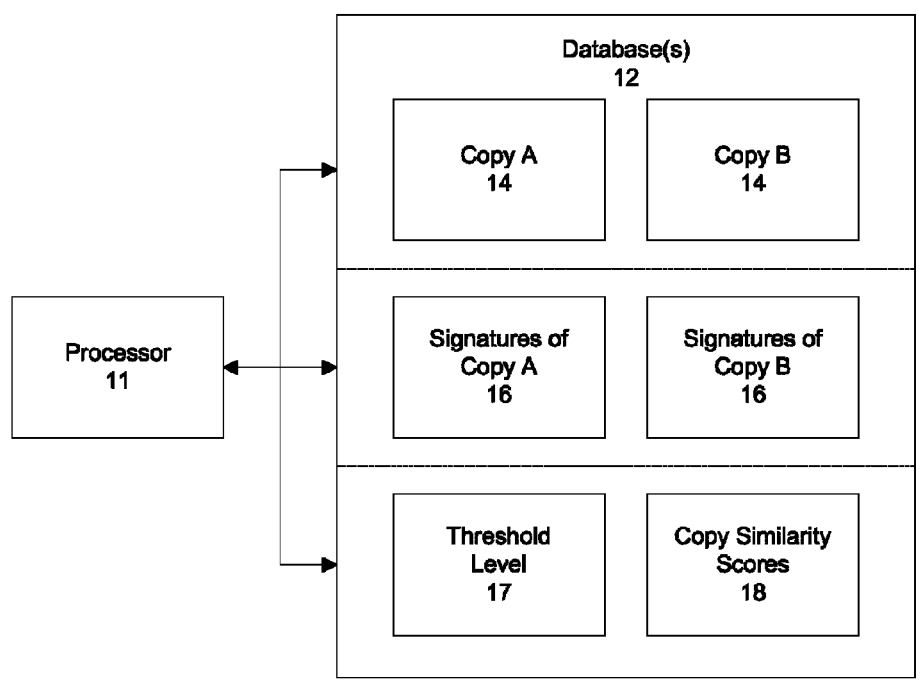
FIG. 3 is a schematic diagram illustrating an exemplary system for verification of media content synchronization according to another example embodiment of the present invention.

FIG. 3 is a schematic diagram illustrating another exemplary system 30 for verification of media content synchronization according to an example embodiment of the present invention.

Similar to the system 10 as shown in FIG. 1, the system 30 includes a processor 11, and one or more databases 12. The database 12 store a plurality of copies 14 of a program, e.g., copy A and copy B, signatures 16 of the plurality of copies 14, a threshold level 17 for synchronization verification, and similarity scores 18 for the plurality of copies 14. As schematically illustrated by the dashed lines in FIG. 3, one or more databases 12 may store one or more of the above sets of data.

The plurality of copies 14 of the program may be converted, packaged, and/or otherwise processed for distribution to particular output devices, as described above with reference to FIG. 1. Although FIG. 3 illustrates only two copies, i.e., copy A and copy B, for simplicity of discussion, it is understood that the database 12 may include a plurality of, e.g., more than two, copies 14 that have been processed for a plurality of different output devices.

The database 12 may also store signatures 16 of each of the plurality of copies 14, as described above with reference to FIG. 1. The generation of the signatures 16 will be further discussed herein with reference to FIG. 6.

The database 12 can also store a threshold level 17 for synchronization verification, as described above with reference to FIG. 1, which defines an acceptable level of synchronization of a copy 14 as compared to another copy 14. The threshold level 17 for synchronization verification will be further discussed herein with reference to FIG. 6.

The database 12 may also store similarity scores 18 for each of the plurality of copies 14, as described above with reference to FIG. 1. According to an example embodiment, the scores 18 may be calculated based on a comparison between the signatures 16 of a copy 14 and the signatures 16 of another copy 14. For example, the scores 18 may be a measure related to a variance between the video and audio streams of a first copy 14 as compared to the video and audio streams of a second copy 14. The scores 18 may then be compared with the threshold level 17 in order to determine whether each of the plurality of copies 14 is acceptable for delivery to an end user. If there are more than two copies, each copy 14 is compared to each of the other copies 14, such that each copy 14 will have similarity scores 18 with respect to each of the other copies 14. The similarity scores 18 will be further discussed herein with reference to FIG. 6.

Figure 4:
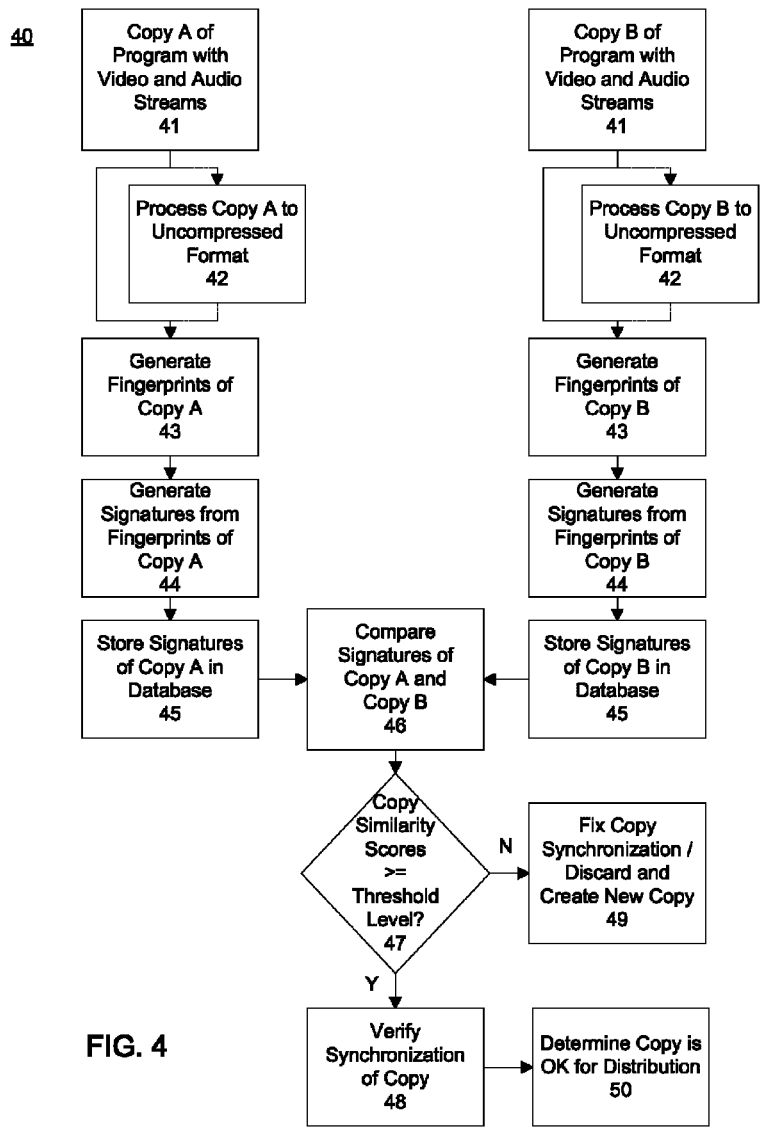
FIG. 4 is a flowchart illustrating an exemplary method of verification of media content synchronization according to another example embodiment of the present invention.

FIG. 4 illustrates an exemplary method 40 of verification of media content synchronization according to another example embodiment of the present invention, and FIG. 6 illustrates an example of generating fingerprints and signatures for verification of media content synchronization according to an example embodiment of the present invention.

Referring to FIG. 4, at step 41, a plurality of copies 14, e.g., at least two copies, Copy A and Copy B, of a program having video and audio streams may be provided. As explained above, due to conversion, packaging, and/or other processing during the creation of each of the plurality of copies 14, the data streams of each copy 14 might be altered with respect to those of other copies 14, i.e., the synchronization between data streams may be altered. At step 42, if required, each of the plurality of copies 14 may be processed to an uncompressed format. Step 42 might not be required if each of the plurality of copies 14 is already in an uncompressed format. In an alternative example embodiment, the generation of the fingerprints and signatures can be performed in a format other than the uncompressed format.

At step 43, fingerprints of each of the plurality of copies 14 may be generated using known fingerprinting processes. The fingerprints of each of the plurality of copies 14 may include at least one video fingerprint of the video stream and at least one audio fingerprint of the audio stream. The fingerprints may be generated for corresponding segments in time of each of the video stream and audio stream. That is, each video fingerprint may have a corresponding audio fingerprint over a matching segment in time of the video/audio streams. At step 44, signatures 16 of each of the plurality of copies 14 are generated based on the combined fingerprints of the video and audio streams that correspond to the same segments in time. At step 45, the signatures 16 of each of the plurality of copies 14, and optionally the fingerprints, may be stored in the database 12.

The fingerprints and signatures 16 can be generated faster than a time required for real-time playback. The length of the sample segments and the relative spacing between segments may be determined, for example, based on the length of each of the plurality of copies 14 and/or the number of signatures needed to reliably determine synchronization between the video and audio streams.

The fingerprints and signatures 16 of each of the plurality of copies 14 can be generated faster than real-time. That is, the entirety of each copy 14 need not be output in real-time to create the signatures 16. It is advantageous to use sample segments in time for the generation of signatures 16 of each copy 14 that are the same as those used for the generation of signatures 16 of each of the other copies, such that a direct comparison between the signatures 16 of each copy 14 may be possible. In addition, for a plurality of copies 14 of a program, the fingerprint generation and signature generation processes can be parallel-processed faster than real-time, thereby resulting in further time savings.

By completing steps 41 to 45, signatures 16 of each of the plurality of copies 14 having video and audio streams can be stored in the database 12. At step 46, the signatures 16 of each of the plurality of copies 14 are compared to signatures of others of the plurality of copies 14 in order to determine whether such copies 14 are equal, or not equal, with respect to the relationships between their respective video and audio streams.

Because the signatures 16 of each of the plurality of copies 14 may be generated over corresponding segments in time of the video and audio streams, it is possible to directly compare signatures 16 and quickly determine the degree of similarity/dissimilarity. For example, referring to FIG. 6, signature 16a of each copy 14 can be compared directly with signature 16a of each of the other copies 14 because each of these signatures 16a is generated over the same sample period of time Ta. For the same reasons, signatures 16b of the plurality of copies 14 over sample period of time Tb can be directly compared, signatures 16c of the plurality of copies 14 over sample period of time Tc can be directly compared, etc. Further, the comparison of the signatures 16 can be completed as a file-based comparison without requiring a real-time playback of the video/audio streams of any of the plurality of copies 14. Thus, it may be possible to quickly and simply compare the signatures 16 faster than real-time, without requiring playback of the plurality of copies.

The comparison of each pair of signatures 16a (16b, 16c, etc.) results in a similarity score for each pair of signatures. In an example embodiment, the similarity scores are measures related to a variance between each signature 16 of each of the plurality of copies 14 as compared to each signature 16 of each of the other of the plurality of copies 14. For example, the similarity scores may be expressed as a percentage of matching between each pair of signatures 16, 100% denoting an exact match between the signatures and 0% denoting a complete mismatch between the signatures. Alternatively, the similarity scores can be based on any other scoring method that provides a range between an exact match and a complete mismatch.

At step 47, each similarity score 18 of each pair of signatures 16 is compared against a threshold level 17. The threshold level 17 for synchronization verification may define an acceptable level of similarity between compared copies 14. For example, the threshold level 17 may be a level related to an acceptable variance between the signatures 16 of each of the plurality of copies 14. In the case in which the similarity scores 18 are expressed as percentages, for example, the threshold level 17 may also be expressed as a percentage, at and/or above which the compared copies 14 may be considered to be equal in relationship between their video and audio streams.

If the similarity scores 18 for signatures 16 of a copy 14 meet and/or exceed the threshold level 17 for synchronization verification with signatures 16 of each of the others of the plurality of copies 14, then such copies 14 are determined to constitute a group of copies 14 that are equal in relationship between their video and audio streams. All copies 14 within the group determined to be equal in relationship should have similarity scores within a tight tolerance. Any copy for which there is a variance outside the tight tolerance, i.e., a copy that is not equal in relationship with all the other copies of the group, is not included in the group. Then at step 48, a verification, for example, a manual verification, of the synchronization of the group of copies 14 determined to be equal in relationship between their video and audio streams may be performed by choosing a single copy 14 from the group for verification. The chosen copy 14 may then be manually verified for media content synchronization by a person testing synchronization who views and listens to the chosen copy 14 to verify the synchronization. Alternatively, other methods of verification of media content synchronization of the chosen copy 14 may be used. If the chosen copy 14 is verified as having good synchronization, then at step 50, the group of copies 14 that have previously been determined to be equal in relationship between their video and audio streams to the chosen copy 14 may be determined to be acceptable for distribution to end users.

On the other hand, if the similarity scores 18 for signatures 16 of a copy 14 do not meet the threshold level 17 for synchronization verification with signatures 16 of at least one of the others of the plurality of copies 14, then at step 49, the copy 14 may undergo processing to fix the synchronization errors, or the copy 14 may be discarded and a new copy created, which is to be verified for media content synchronization.

Alternatively, a combined score may be generated based on the individual scores of the individual signature comparisons, which combined score may be compared to a threshold. Alternatively, a single pair of signatures may be compared to produce a single score compared to a threshold.

According to the example embodiments of the present invention, verification of media content synchronization may be completed faster than real-time. For example, the generation of fingerprints and/or signatures of the plurality of copies may be completed faster than real-time by sampling segments of the plurality of copies. Further, the comparison of the signatures of the plurality of copies is performed based on the signatures stored as files in a database, for example. Thus, the comparison may also be performed faster than real-time, since it is again not necessary to linearly output in real-time any of the plurality of copies in order to perform the comparison.

Moreover, by the use of similarity scores based on a comparison between signatures and by the use of a threshold level for such similarity scores, a consistent and objective level of verification of media content synchronization may be provided that is not dependent on outside factors such as human error, fatigue, stress and others. Therefore, a consistent end user experience may be ensured by eliminating the high number of variables associated with manual verification of synchronization performed by humans, as described above. The threshold level with which the system is programmed, and which is applied to the plurality of copies of a program may be set to provide an improved end user experience, and/or reduce the number of false negatives, i.e., programs that, although rejected as having synchronization errors, are actually acceptable because the errors are not ascertainable by end users. Further, since no test signals or data are added to the video and/or audio streams of the plurality of copies, there is no additional risk of detrimentally affecting the end user experience by the transmission of such added test signals or data to end users.

Referring to FIG. 5, the generation of the fingerprints and signatures 15 of the master program 13 will be discussed in more detail. FIG. 5 schematically illustrates a portion of a video stream 13V and a portion of an audio stream 13A of the master program 13. The video stream 13V is schematically illustrated as sequential video frames, and the audio stream 13A is schematically illustrated as a continuous audio wave. Each of the video stream 13V and the audio stream 13A of the master program 13 is sampled during sequential time segments Ta, Tb, Tc, . . . , Tn. For each time segment, a video fingerprint and an audio fingerprint, a, b, c, . . . , n, may be generated. For example, for a time segment Ta, a video fingerprint a and an audio fingerprint a may be generated; for a time segment Tb, a video fingerprint b and an audio fingerprint b may be generated; etc. Further, for each pair of video and audio fingerprints in a single time segment, a signature may be generated. Thus, for example, for a time segment Ta, a signature 15a may be generated from the combination of the video fingerprint a and the audio fingerprint a; for a time segment Tb, a signature 15b may be generated from the combination of the video fingerprint b and the audio fingerprint b; etc. Each of the signatures 15a, 15b, 15c, . . . , 15n may be stored in the database 12.

The fingerprints and signatures 15 can be generated faster than a time required for real-time playback. The length of the sample segments and the relative spacing between segments can be determined, for example, based on the length of the master program 13 and/or the number of signatures needed to reliably determine synchronization between the video and audio streams.

Referring to FIG. 6, similar to the above discussion with respect to the generation of fingerprints and signatures 15 of the master program 13, the generation of the fingerprints and signatures 16 of the copy 14 will be discussed in more detail. FIG. 6 schematically illustrates a portion of a video stream 14V and a portion of an audio stream 14A of the copy 14. The video stream 14V is schematically illustrated as sequential video frames, and the audio stream 14A is schematically illustrated as a continuous audio wave. Each of the video stream 14V and the audio stream 14A of the copy 14 is sampled during sequential time segments Ta, Tb, Tc, . . . , Tn. For each time segment, a video fingerprint and an audio fingerprint, a, b, c, . . . , n, may be generated. For example, for a time segment Ta, a video fingerprint a and an audio fingerprint a may be generated; for a time segment Tb, a video fingerprint b and an audio fingerprint b may be generated; etc. Further, for each pair of video and audio fingerprints in a single time segment, a signature may be generated. Thus, for example, for a time segment Ta, a signature 16a may be generated from the combination of the video fingerprint a and the audio fingerprint a; for a time segment Tb, a signature 16b may be generated from the combination of the video fingerprint b and the audio fingerprint b; etc. Each of the signatures 16a, 16b, 16c, . . . , 16n may be stored in the database 12.

The signatures of the video and audio streams 14V, 14A, can be generated faster than real-time. That is, the entirety of the copy 14 need not be output in real-time to create the signatures 16. It may be advantageous to use sample segments for the generation of signatures 16 of the copy 14 that are the same as those used for the generation of signatures 15 of the master program 13, such that a direct comparison between the signatures 15, 16 may be possible. In addition, for a plurality of copies 14 of a program, the fingerprint generation and signature generation processes can be parallel-processed faster than real-time, thereby resulting in further time savings.

In an example embodiment of the present invention, the system may provide a user interface via which a user may manually select the threshold to which the similarity score is compared. For example, depending on a content of the media program, different levels of synchronization may be acceptable. The user may therefore select the threshold depending, for example, on the nature of the content.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, as a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware-implemented computer readable media, e.g., as described above, having stored thereon instructions executable by a processor, which, when executed, cause one or more processors to perform the example methods described above, or portions thereof.

An example embodiment of the present invention is directed to a method of transmitting instructions executable by one or more processors, the instructions, when executed, causing the processor(s) to perform the example methods described above, or portions thereof.

An example embodiment of the present invention is directed to an analysis paradigm as described above, which may include one or more memory devices, such as described above, storing one or more, e.g., all, of the master program, copies of the master program, fingerprints, signatures, similarity scores and/or threshold levels for synchronization verification described above, and/or which may include one or more processing devices, such as those described above, for implementing the described methods using the master program, copies of the master program, fingerprints, signatures, similarity scores and/or threshold levels for synchronization verification.

Those skilled in the art can appreciate from the foregoing description that the present invention can be implemented in a variety of forms. For example, while above description refers to a media program that includes two components whose synchronization is tested by generating fingerprints and signatures, in alternative embodiments, the synchronization of a media program including three or more components to be synchronized may be tested, e.g., by performing the above-described methods with the variation of generating respective fingerprints for the three or more components, and generating the signatures based on the combination of all of those respectively generated fingerprints. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A computer-implemented method of verification of media content synchronization, the method comprising:
   determining, by a computer processor, at least one similarity score of a copy of a master program based on a comparison of at least one signature of the copy with at least one signature of the master program;
   wherein the at least one similarity score is determined faster than real-time in a file-based domain.

2. The method of claim 1, further comprising:
   based on the determination, determining, by the processor, whether to provide the copy for distribution.

3. The method of claim 1, wherein the at least one similarity score represents a variance between the at least one signature of the copy and the at least one signature of the master program.

4. The method of claim 1, wherein the at least one similarity score is determined without altering a video stream and an audio stream of the master program and the copy.

5. The method of claim 1, further comprising:
comparing, by the processor, the at least one similarity score to a threshold level.

6. The method of claim 5, wherein the copy is determined to be acceptable for distribution if the at least one similarity score at least one of meets and exceeds the threshold level.

7. The method of claim 5, further comprising:
adjusting the threshold level.

8. The method of claim 1, further comprising:
generating, by the processor, a video fingerprint of a segment of a video stream of the master program, and an audio fingerprint of a corresponding segment of an audio stream of the master program;
generating, by the processor, a video fingerprint of the corresponding segment of a video stream of the copy, and an audio fingerprint of the corresponding segment of an audio stream of the copy;
generating, by the processor, the at least one signature of the master program based on the video fingerprint and the audio fingerprint of the master program; and
generating, by the processor, the at least one signature of the copy based on the video fingerprint and the audio fingerprint of the copy.

9. The method of claim 8, further comprising:
storing, by the processor, the at least one signature of the master program and the at least one signature of the copy in a database.

10. The method of claim 8, further comprising:
prior to the generating of the video fingerprint and the audio fingerprint of the master program, converting, by the processor, the master program to an uncompressed format; and
prior to the generating of the video fingerprint and the audio fingerprint of the copy, converting, by the processor, the copy to an uncompressed format.

11. A hardware computer-readable medium having stored thereon instructions executable by a processor, the instructions which, when executed by the processor, cause the processor to perform a method of verification of media content synchronization, the method comprising:
determining at least one similarity score of a copy of a master program based on a comparison of at least one signature of the copy with at least one signature of the master program;
wherein the at least one similarity score is determined faster than real-time in a file-based domain.

12. A transmission method comprising:
transmitting, by a hardware device, instructions executable by a processor, the instructions which, when executed by the processor, cause the processor to perform a method of verification of media content synchronization, the method comprising:
determining at least one similarity score of a copy of a master program based on a comparison of at least one signature of the copy with at least one signature of the master program;
wherein the at least one similarity score is determined faster than real-time in a file-based domain.

13. A system for verification of media content synchronization, comprising:
a computer processor configured to determine at least one similarity score of a copy of a master program based on a comparison of at least one signature of the copy with at least one signature of the master program;
wherein the at least one similarity score is determined faster than real-time in a file-based domain.

14. A computer-implemented method for verification of media content synchronization, comprising:
for each of two versions of media content:
for each of at least one segment of a first media component of the respective media content, generating, by a computer processor, a fingerprint representative of the respective segment of the first media component; and
for each of at least one segment of a second media component of the respective media content, generating, by the processor, a fingerprint representative of the respective segment of the second media component;
comparing, by the processor, the fingerprints generated for one of the two versions to the fingerprints generated for another of the two versions, the comparison being performed in a processing time that is less than a time required for playback of the media content versions;
generating, by the processor, a score representing a degree of difference between the compared fingerprints;
comparing, by the processor, the score to a threshold; and
providing, by the processor, one of the two versions conditional upon that the score meets the threshold.

15. The method of claim 14, further comprising:
for the each of the two versions of the media content:
for each of at least one segment pair formed by a respective one of the each of the at least one segment of the first media component and a respective one of the each of the at least one segment of the second media component, generating a signature of the pair, wherein the comparison is performed by comparing the signatures generated for the two versions.

16. The method of claim 14, wherein the comparison is performed prior to playback.

17. A computer-implemented method of verification of media content synchronization, the method comprising:
for each of a plurality of copies of a program, determining, by a computer processor, at least one similarity score of the respective copy based on a comparison of at least one signature of the respective copy with at least one signature of another of the plurality of copies;
wherein the at least one similarity score is determined faster than real-time in a file-based domain.

18. The method of claim 17, wherein each pair of the plurality of copies for which a similarity score is determined that meets or exceeds a threshold are determined to be equal with respect to a relationship between their respective data streams.

19. The method of claim 18, wherein, for a group of the plurality of copies for each of which similarity scores to all others of the group are determined that meet or exceed the threshold, synchronization of the copies of the group is determined by a manual verification process of one of the copies of the group.

* * * * *